United States Patent [19]

Alderfer et al.

[11] Patent Number: 4,932,205
[45] Date of Patent: Jun. 12, 1990

[54] BYPASS VALVE AND VISUAL INDICATOR FOR A FUEL SYSTEM

[75] Inventors: Ronald R. Alderfer, South Bend; Paul W. Futa, Jr., North Liberty, both of Ind.

[73] Assignee: Allied-Signal Inc., Morristown, N.J.

[21] Appl. No.: 315,969

[22] Filed: Feb. 27, 1989

[51] Int. Cl.$^5$ ............................................... F02C 7/22
[52] U.S. Cl. .................................. 60/39.091; 60/734; 210/91; 210/130
[58] Field of Search ............... 60/39.091, 39.281, 734; 210/85, 91, 130, 133, 416.4

[56] References Cited

U.S. PATENT DOCUMENTS

| | | | |
|---|---|---|---|
| 3,464,556 | 9/1969 | Cullen | 210/130 |
| 3,487,929 | 1/1970 | Sample et al. | 210/91 |
| 3,670,889 | 6/1972 | Brown et al. | 210/130 |
| 3,790,931 | 2/1974 | Leveraus | 210/133 |
| 3,970,104 | 7/1976 | Decker et al. | 210/130 |
| 4,272,368 | 6/1987 | Foord et al. | 210/133 |
| 4,827,714 | 5/1989 | Miles | 60/734 |

Primary Examiner—Louis J. Casaregola
Attorney, Agent, or Firm—Leo H. McCormick, Jr.; Ken C. Decker

[57] ABSTRACT

A bypass valve 30 for a fuel supply system 10 of an aircraft. The bypass valve 30 has a housing 32 with a chamber 38 having an entrance port 34 connected to a pump 16 and an exit port 36 connected to a regulator 14. An end cap 44 which is screwed into the housing 32 to seal the chamber 38. A sleeve 46 which extends from the end cap 44 into chamber 38 has a series of radial openings 48 and 50 to communicate the exit port with the interior of the sleeve 46. A piston 58 is retained in the sleeve 46 by a retainer stop 68. A spring 64 acts on the piston 58 to move a face 66 against retainer stop 68 to separate the entrance port 34 from the exit port 36. When a predetermined pressure drop occurs across a filter 26, piston 58 moves and allows fuel to directly flow to regulator 14 without passing through filter 26. At the same time, the fluid pressure acts on the cylindrical body 76 of indicator 74 to move face 75 away from housing 32 and provide a visual indication that unfiltered fuel has entered the fuel system.

7 Claims, 2 Drawing Sheets

BYPASS VALVE AND VISUAL INDICATOR FOR A FUEL SYSTEM

This invention relates to a bypass valve and visual indicator for an aircraft fuel supply system having a pressure differential responsive piston that moves to allow fuel from a source be directly supplied to a regulator without passing through a filter. Once the piston moves to allow fuel to directly flow to the regulator, an indicator moves to provide a visual indication of such movement and a corresponding need to evaluate the operation of the fuel system.

U.S. Pat. No. 4,245,462 discloses a fuel system wherein fuel from a source or reservoir is supplied to a regulator by a pump. As shown in this typical system, fuel passes through a filter prior to being supplied to the regulator for distribution to the combustion chamber in the turbine. The need for clean operational fluid should be evident since dirty or contaminated fuel could cause valves to stick and as a result the regulator would malfunction. It is common for a regulator to have an electronic sensor which supplies a CPU and an indicator in the instrument panel of an aircraft with a readout of the quantity of fuel being supplied to the turbine. If the flow of fuel through the filter is reduced, the fluid pressure of the fuel supplied to both the regulator for distribution to the combustion chamber and as the operational fluid for operating the various components is reduced. As a result, such a reduction in pressure may have an adverse effect on the operation of the turbine. The electronic sensor is designed to provide the operator with a warning when the pressure of the fuel is reduced to a preselected level. Unfortunately, if this level is reduced while the aircraft is in flight, the power generated by the turbine could be reduced to a point where the operation of the aircraft is in peril.

It is an accepted principle that it would be better to allow unfiltered fuel be supplied to the turbine than require the turbine to operate with a fuel whose pressure has been reduced to a level which may adversely effect the operation of an aircraft.

The present invention relates to a bypass valve having a visual indicator in the fuel system for an aircraft which allows the output of a pump to be directly connected to a regulator if flow through a filter is restricted. The bypass valve has a housing with a piston located in a chamber for separating an entrance port from an exit port. A spring acts on and moves the piston against a retainer stop where the body of the piston overlaps the exit port to prevent fuel communicated from the pump into the chamber through the entrance port. The exit port is in communication with the conduit through which filtered fuel is supplied to the regulator. A projection that extends from the face on the piston is located in a groove of a cylindrical body of an indicator that is retained in the housing. The unfiltered fuel from the pump and the filtered fuel develop a pressure differential across the piston. As long as the force developed by the pressure differential is less than the force of the spring, the piston remains on the seated on the retainer stop and all fuel from the pump is supplied to the regulator through the filter. When the developed pressure differential force across the piston exceeds the spring force, the piston moves and fuel from the pump flows through the chamber from the entrance port to the exit port for distribution to the regulator without going through the filter. On the initial movement of the piston, a projection on the piston moves out of a retaining groove in the cylindrical body of the indicator. Thereafter, the fluid pressure of the fuel from the pump acts on the cylindrical body and moves a first end with respect to the housing to provide a visual indication of bypassed fuel. Contours on the projection of the piston insure entrapment of the retainer stop as fuel flows through the chamber in addition to directing the flow of fuel through the chamber such that cavitation and other flow created turbulence is either eliminated or substantially reduced to a point where it is not a factor. Later, when the aircraft has landed and the turbine shut down, the spring moves the piston against the retainer stop to again interrupt fluid communication between the entrance port and exit port. However, the projection that extends from the piston prevents the cylindrical body from re-entering the chamber and provide a continued indication that unfiltered fuel was supplied to operate the turbine. The cylindrical body can only be reset by a positive manual action of an operator.

It is an object of this invention to provide a fuel system for an aircraft with a bypass valve having a visual indicator which would allow unfilter fuel to be supplied to operate an engine in an emergency condition.

The inclusion of this bypass valve in a fuel system for an aircraft provides an assurance that operational fluid for powering a turbine in an aircraft will not fall below a preselected level even if the flow of fuel through a filter is restricted.

This invention provides a fuel system with a bypass valve having an indicator which is actuated by initial movement of a piston responding to a predetermined pressure differential that develops between fuel that is presented to a filter and fuel that passes through the filter to inform a maintenance person that unfiltered fuel has entered the fuel system.

These and other advantages and objects should be evident from reading this specification while viewing the drawing wherein.

Figure 1:
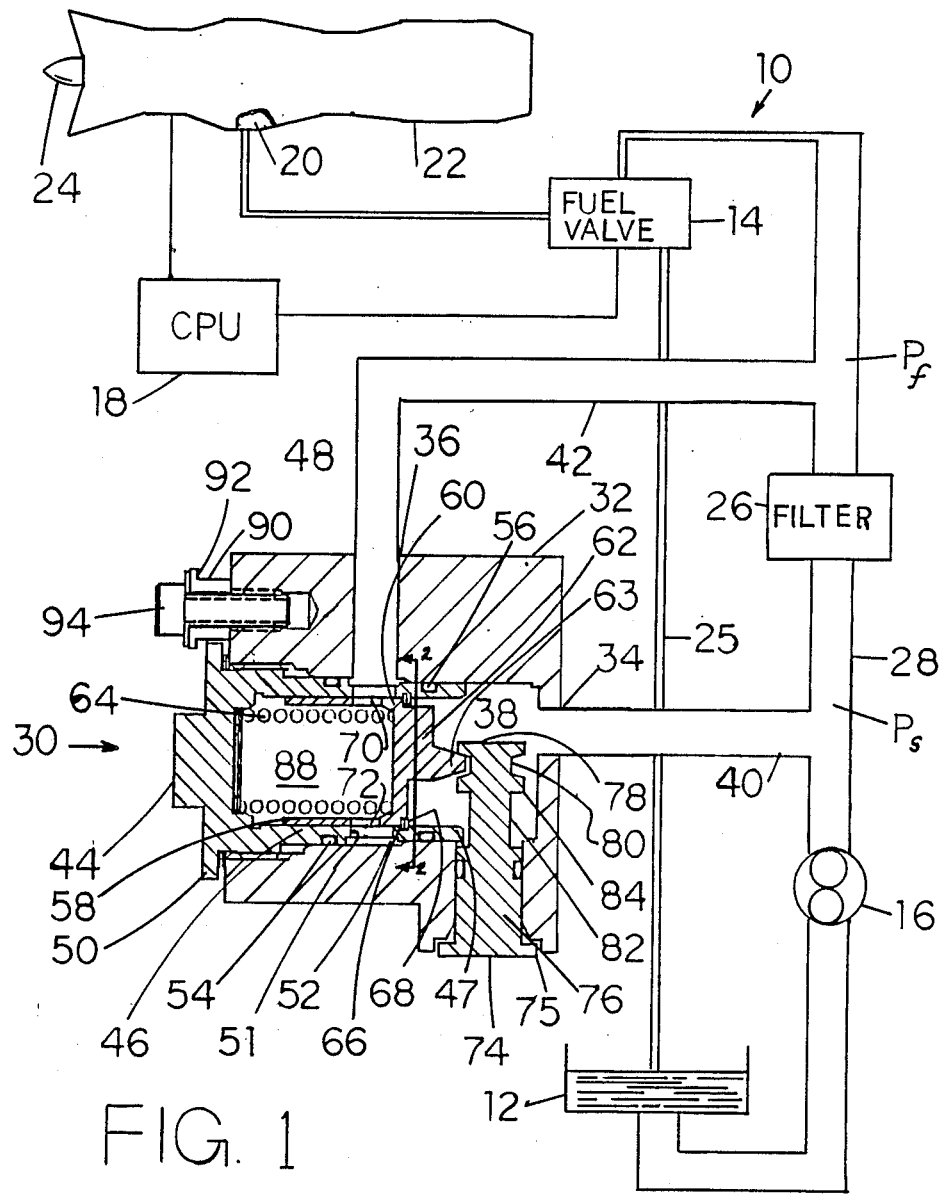
FIG. 1, is a schematic illustration of a fuel system with a sectional illustration of a bypass valve made according to the principals of this invention.

In the fuel system 10 shown in FIG. 1, fuel from a source or reservoir 12 is supplied to a regulator 14, of the type disclosed in U.S. Pat. No. 4,245,462, by a pump 16. The regulator 14, in response to an operational input from a computer 18, allows fuel from the pump to be communicated to the combustion chamber 20 in a turbine engine 22. The fuel that is supplied to the combustion chamber 20 is ignited and provides the force for rotating a turbine 24 within the engine 22 to create power which moves an aircraft.

Operational parameters in the engine 22 are communicated to the computer 18 which can provide the regulator 14 with a modifying signal to optimize the ratio of fuel to air supplied to the combustion chambers 20. A portion of the fuel supplied to the regulator 14 is diverted to operate the metering valve, governor, regulator and various other components in the regulator 14 with any excess fuel being returned to reservoir 12 by return conduit 25.

In order that the components in the regulator 14 and injectors in the combustion chamber 20 operate in an acceptable manner over an extended period of time it is imperative that clean fuel be provided by the fuel system 10. As a result a filter 26 is located in supply conduit 28 to remove wax, dirt, water and other contaminates from the fuel prior to the fuel being supplied to the regulator 14. Unfortunately, when the filter removes contaminates from the fuel supply, the fluid pressure $P_s$ is reduced to a level $P_f$ for the fuel actually supplied to the regulator 14. As long as the fluid pressure $P_f$ is above a predetermined value or level, the fluid regulator 14 operates in a satisfactory manner without any adverse effect on either the operation of the components or the actual fuel supplied to the injectors in the combustion chamber 20.

A sensor in the regulator 14 is designed to provide a feedback to the CPU 18 with respect to the fluid pressure $P_f$ in the fuel activity presented to the regulator 14. When the fluid pressure $P_f$ reaches a predetermined level which would effect the operation of either the engine 22 or regulator 14 a warning signal is provided to the operator which indicates that filter 26 needs to be serviced. As long as the engine is on the ground, this single signal with respect to filter maintenance is adequate. However, if this signal develops when the aircraft is in flight, it is better that unfiltered fuel be supplied to the regulator 14 rather than the fluid pressure in the fuel be allowed to fall below a preselected value. Bypass valve 30 is designed to so assure that the fluid pressure $P_f$ of the fuel supplied to a regulator 14 from pump 16 is always above a minimal fluid pressure during operation of pump 16.

Bypass valve 30 has a housing 32 with a chamber 38. Chamber 38 has an entrance port 34 and an exit port 36. Entrance port 34 is connected to pump 16 by conduit 40 while exit port 36 is connected to the output conduit of filter 26 or regulator 14 by conduit 42. Chamber 38 in housing 32 is closed by an end cap 44 which has a cylindrical sleeve 46 that extends into chamber 38. Sleeve 46 has a series of radial openings 48 and 51 that are aligned with a groove 52 in housing 32 associated with exit port 36. When flange 50 on end cap 44 engages housing 32, seals 54 and 56 effectively seal chamber 38 from the surrounding environment. Bolt 94 is screwed into housing 32 to fix a retainer 90 such that end cap 44 can not be removed from housing 32 of bypass valve 10. A piston 58 located in sleeve 46 has a wall 60 with a projection 62 extending therefrom toward the entrance port 34. A spring 64 located between cap 44 and wall 60 urges face 66 toward a retainer stop 68. Thus, piston 58 is effectively caged within the cylindrical sleeve 46 of the end cap 44. A series of radial opening 70 and 72 on piston 58 allow the fluid pressure present in groove 52 and exit port 36 to be communicated to the interior 88 of sleeve 46.

An indicator member 74 has a cylindrical body 76 located in housing 32. Cylindrical body 76 has an end 78 that extends into chamber 38 and a first retainer groove 80 separated from a second retainer groove 82 by a land 84. End 47 on sleeve 46 extends into grove 82 while end 63 on projection 62 extends into groove 80. End 63 of projection 62 engages the cylindrical body 76 to hold face 75 flush with housing 32.

As long as the fluid pressure $P_f$ of the fuel supplied to regulator 14 is above a predetermined level, the force produced by the pressure differential created from the fluid pressure $P_s$ in chamber 38 and $P_f$ in chamber 88 can not overcome the force of spring 64 and piston 58 remains on retainer stop 68 to prevent the flow of fuel from the entrance port 34 to the exit port 36 through chamber 38.

Figure 2:
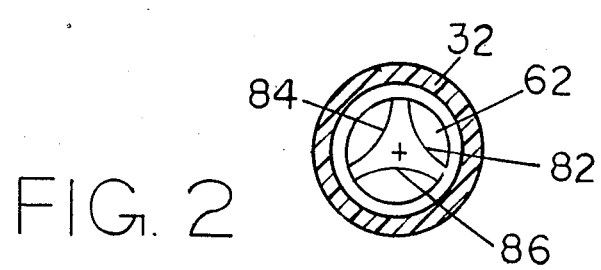
FIG. 2, is a sectional view taken along lines 2—2 of FIG. 1 showing a contoured projection extending from a wall of a moveable piston.
Figure 3:
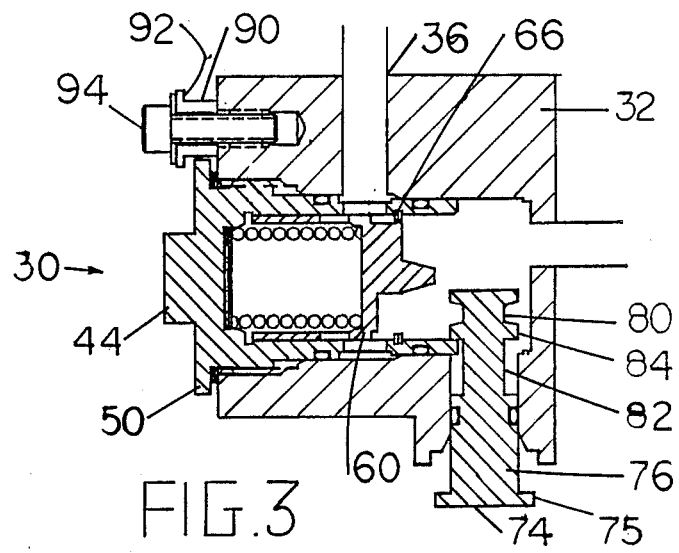
FIG. 3, is a sectional view of the bypass valve with the piston in FIG. 1 moved to a position to allow fuel to flow from an entrance port through an exit port.

When the pressure differential across wall 60 reaches a predetermined level corresponding to a pressure drop across filter 26, spring 46 is overcome and piston 58 moves away from retainer stop 68 to allow fuel to flow from entrance port 34 to exit port 36 through chamber 38 as illustrated by the position of piston 58 in FIG. 3. Flow of fuel through chamber 38 is essentially free of turbulence and contours 83, 85 and 86 (see FIG. 2) on projection 62 of piston 58 prevent retainer stop 66 from being moved from a groove in sleeve 46. When projection 63 moves out of the first retaining groove 80, the fluid Pressure $P_s$ acts on cylindrical member 76 and moves face 75 away from housing 32 to provide a visual indication that piston 58 has moved. Land 84 engages end 47 on sleeve 46 to prevent or limit the movement of face 75 with respect to housing 32. Flow from pump 16 continues to bypass filter 16 until the demand for fuel to the engine 22 terminates.

Figure 4:
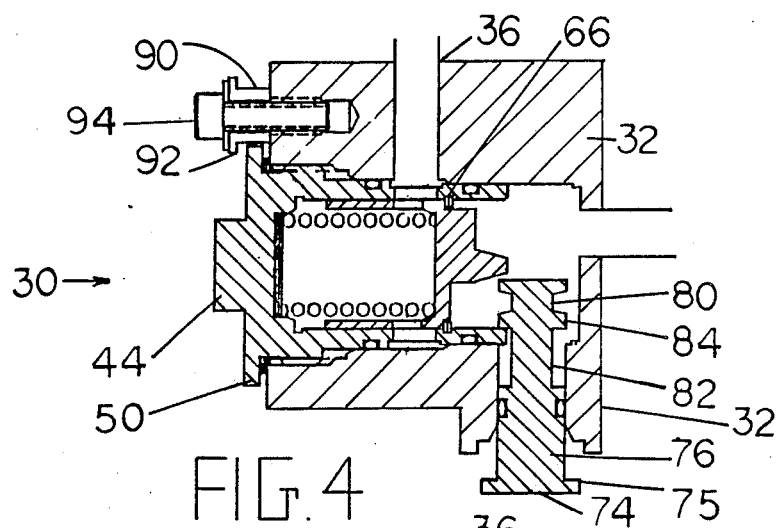
FIG. 4, is a sectional view of the bypass valve of FIG. 1 with an indicator moved to provide a visual indication of bypasses flow of fuel.
Figure 5:
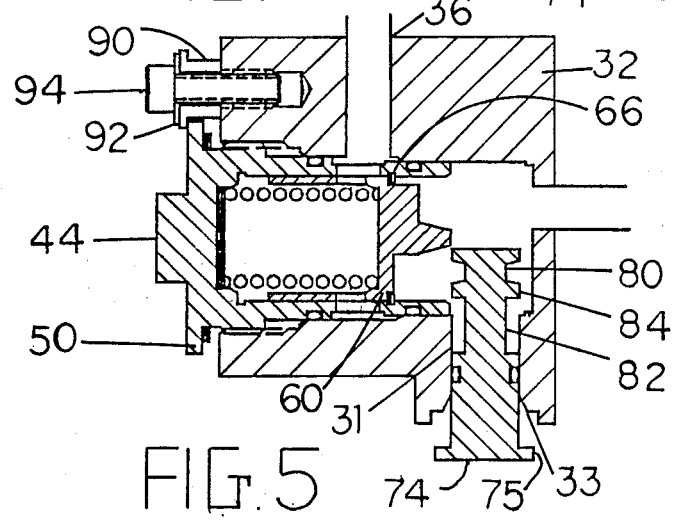
FIG. 5, is a sectional view of the bypass valve showing the structure for resetting the indicator while preventing the piston from being removed from the housing of the bypass valve.

When the demand for fuel for the engine 22 terminates, spring 64 moves piston 58 toward retainer stop 68 to again bring face 66 into engagement with retainer stop 68, as shown in FIG. 4, to prevent fluid flow through chamber 38. However, end 63 on projection 62 acts on end 78 of the cylindrical body 76 to prevent face 75 from re-entering housing 32. Indicator 74 thereafter remains unactivated until manually reset by a ground maintenance person through a process illustrated by the structure in FIG. 5.

. To manually reset the indicator 74, end cap 44 is screwed from housing 32 until flange 50 engages shoulder 92 on retainer 90. When flange 50 engages shoulder 92, end 63 on projection 62 of piston 58 and end 47 on sleeve 46 are aligned with the edge 31 of opening 33. Thereafter, cylindrical body 76 of indicator 74 can be moved into chamber 38 until face 75 engages housing 32. Thereafter, end cap 44 is screwed into housing 32 until flange 50 engages housing 32 to again align the structural components in a manner illustrated in FIG. 1.

As clearly illustrated in FIG. 1, the bypass valve 30 is remotely positioned within the fuel system 10 with respect to the filter 26. In this remote position, during bypass flow particles or contamination is not removed from the filter element and introduced into the fuel system. In addition, maintenance and inspection by a flight crew.

We claim:
1. In a fuel system for an engine having a filter through which fuel from a pump passes to a regulator in response to an operator input, said regulator controlling the flow of fuel presented to a combustion chamber in the engine, said regulator having a feedback apparatus to provide an operator with a signal indicative of the fuel supplied to the combustion chamber, the improvement comprising:

bypass means having a housing with a chamber therein, said chamber having an entrance port connected to said pump and an exit port connected to said regulator;

piston means located in said chamber for separating said entrance port from said exit port, said piston having a face with a projection extending therefrom;

stop means located in said chamber;

resilient means located is said chamber for urging said piston means toward said stop means to prevent the flow of fuel from the pump through the housing to the regulator; and indicator means having a body retained in said housing with a first end which extends through said housing into the surrounding environment and a second end which extends into said chamber, said body having a first groove separated from a second groove by a land, said projection on said piston means being located in said first groove, said fuel from said pump having a first fluid pressure which acts on said face of said piston means, said fuel passing through said filter developing a second fluid pressure in the fuel presented to said regulator, said second fluid pressure being communicated to said chamber through said exit port, said first fluid pressure and said second fluid pressure acting on said face of said piston means to develop a pressure differential, said pressure differential opposing the force of said resilient means and when a predetermined pressure differential develops overcoming said resilient means to move, said piston means away from said stop means and said projection out of said first groove to allow fuel from said pump to directly flow to said regulator by way of said entrance port, chamber and exit port, said first fluid pressure acting on said body of said indicator means by moving said first end with respect to said housing to provide a visual indication that said piston means has moved as a result of the development of a predetermined pressure differential.

2. The fuel system as recited in claim 1, wherein said piston means further includes:

a plurality of curved surfaces that extend from the face of the projection for engaging said stop means to prevent said stop means from moving during the flow of fuel through said chamber.

3. The fuel system as recited in claim 2 further including;

a cylindrical end cap having a sleeve located in said chamber and attached to said housing, said sleeve having a bore therein for retaining said piston means, said sleeve having a plurality of radial openings and an internal groove located adjacent said openings, said end cap engaging said housings to retain said indicator means in said chamber.

4. The fuel system as recited in claim 2, wherein said stop means includes:

an annular ring located in said groove on said sleeve, said curved surfaces on the piston means preventing said ring from being removed from the groove by the flow of fuel through the chamber.

5. The fuel system as recited in claim 4, wherein said resilient means is located in said bore and is caged between the end cap and piston means.

6. The fuel system as recited in claim 5 further including:

retainer means secured to said housing to prevent said end cap from being removed from said housing.

7. The fuel system as recited in claim 2, wherein said curved surfaces direct the flow of fuel through the chamber with a minimum of turbulence.

* * * * *